No. 673,688. Patented May 7, 1901.
A. B. PICKETT.
BOWLING BALL.
(Application filed Dec. 28, 1900.)
(No Model.)

WITNESSES:
William P. Goebel
Geo. G. Hosted

INVENTOR
Arthur B. Pickett.
BY
Munn
ATTORNEYS

UNITED STATES PATENT OFFICE.

ARTHUR B. PICKETT, OF UNION CITY, OHIO, ASSIGNOR, BY MESNE ASSIGNMENTS, TO BOWLING BALL COMPANY, OF NEW YORK, N. Y.

BOWLING-BALL.

SPECIFICATION forming part of Letters Patent No. 673,688, dated May 7, 1901.

Application filed December 28, 1900. Serial No. 41,358. (No model.)

*To all whom it may concern:*

Be it known that I, ARTHUR B. PICKETT, a citizen of the United States, and a resident of Union City, in the county of Darke and State of Ohio, have invented a new and Improved Bowling-Ball, of which the following is a full, clear, and exact description.

The object of the invention is to provide a new and improved bowling-ball arranged to prevent chipping or breaking of the ball material or the sockets at the outer edges of the walls of the finger-holes.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the views.

Figure 1:
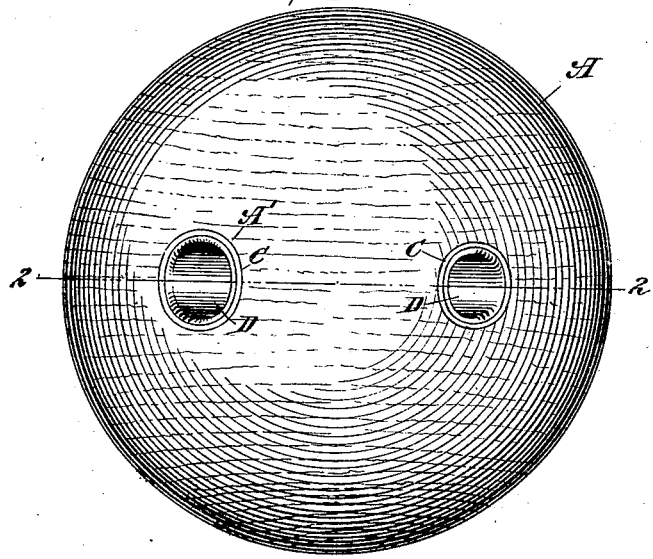
Figure 2:
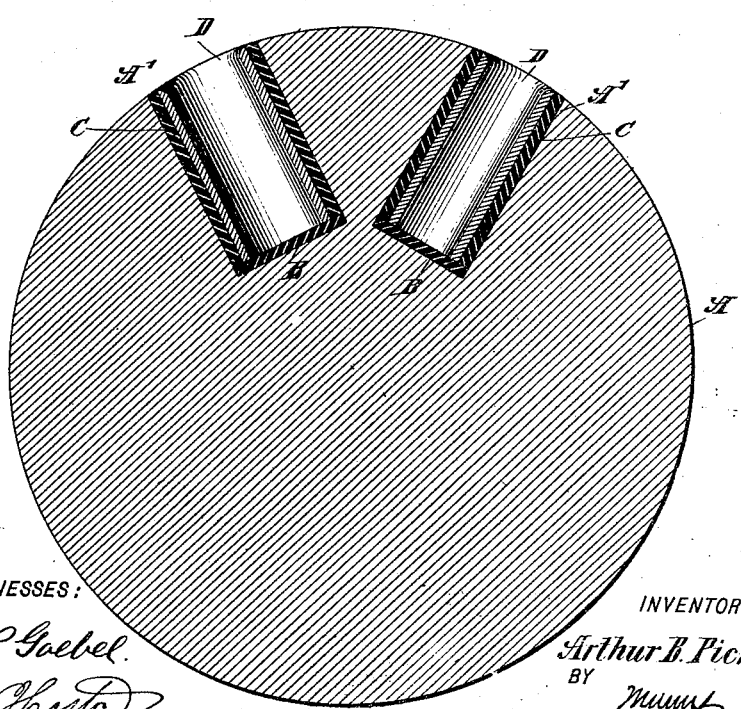

Figure 1 is a side elevation of the improvement, and Fig. 2 is an enlarged sectional plan view of the same.

Bowling-balls as heretofore constructed and made of wood, composition, or other material or covered with rubber have their finger-holes either plain recesses or lined with a bushing or sleeve of hard or elastic material. Now such balls when in use and striking parts of the alley, pins, or other balls are liable to chip at the bushing or at the outer edge of the recess-walls, or at both places, thus rendering the ball useless in a comparatively short time.

With my improvement, presently to be described in detail, the above-noted defects are overcome, as the finger-bushing is free to yield in a lateral as well as an inward direction.

As shown, the ball A is formed with radially-bored finger-holes A', in the bottom of each of which is placed a disk B, of rubber or other elastic material, and on the side wall of said finger-hole is fitted a bushing C, likewise of rubber or other elastic material and containing a second bushing or sleeve D, of non-elastic material, such as fiber, hard rubber, or the like. The two bushings C and D may be fastened together by cement, or the inner bushing D may be driven into the outer elastic bushing C to firmly adhere, and the outer bushing may be driven into the finger-hole or cemented thereto, so as to securely remain in position when the ball is in use.

The inner ends of the bushings C and D rest on the bottom disk B, and the outer end of the bushing C is flared outward, as is plainly shown in the drawings, to present no sharp edges to the finger when using the ball in bowling.

By the arrangement described the finger-bushing D is mounted to yield in a lateral as well as in an inward direction—that is, in the direction of its length—so that when the ball strikes with its finger portion a part of the alley, the pins, or other balls then the bushing C yields in the direction of the blow and hence is not broken or split or otherwise injured.

The elastic bushing C protects the edge of the material at the finger-hole, so that the concussion at or near said edge is not liable to break or split the ball material.

It is understood that when the inner bushing D is caused to yield in a lateral or inward direction, then as soon as the concussion ceases the resiliency of the elastic bushing C and the disk B insures an immediate return of the bushing D to its former position.

Having thus fully described my invention, I claim as new and desire to secure by Letters Patent—

1. A bowling-ball provided with finger-sockets, the said finger-sockets being provided with tubular inner linings composed of smooth, hard material and an interposed cushion of suitable elastic material between the wall of the socket and the outer wall of the inner lining, substantially as set forth.

2. A bowling-ball provided with a rubber jacket and with finger-sockets, the said finger-sockets having an inner hard, smooth lining and an interposed layer of some suitable resilient material between the inner wall of the socket and the outer wall of the inner lining, substantially as set forth.

3. A bowling-ball provided with finger-sockets, the said finger-sockets having inner lining-tubes, and an interposed layer of yielding material between the wall of the socket and the lining-tube, the said lining-tube having an opening at its inner end adapted to be closed when the lining is in place to hold the lining under atmospheric pressure against displacement, substantially as set forth.

4. A bowling-ball having a bushing of a non-elastic material and fitted in the finger-hole of the ball, and means in the finger-hole engaging the said bushing to allow the latter to yield in the direction of its length, as set forth.

5. A bowling-ball having a bushing of non-elastic material and engaging the finger-hole of the ball, and means in the finger-hole and engaging the said bushing to allow the latter to yield in a lateral direction, as set forth.

6. A bowling-ball having a bushing of non-elastic material and engaging the finger-hole of the ball, and means in the finger-hole and engaging the said bushing to allow the latter to yield laterally and in the direction of its length, as set forth.

7. A bowling-ball having a plurality of bushings one within the other, the outer bushing being made of an elastic material and fitted in the finger-hole of the ball, and the inner bushing being made of a non-elastic material, as set forth.

8. A bowling-ball having a recess, an elastic bushing fitted into the said recess in contact with the side wall thereof, an elastic disk resting on the bottom of the recess, and a bushing of a non-elastic material fitted into the said elastic bushing and resting with its inner end on the said disk, as set forth.

9. A bowling-ball having a recess or a finger-hole, an elastic disk on the bottom of the recess, and a bushing seated on said disk, to allow the bushing to yield inwardly in the direction of its length, as set forth.

In testimony whereof I have signed my name to this specification in the presence of two subscribing witnesses.

ARTHUR B. PICKETT.

Witnesses:
 THEO. G. HOSTER,
 EVERARD BOLTON MARSHALL.

DISCLAIMER.

673,688.—*Arthur B. Pickett*, Union City, Ohio. IMPROVEMENT IN BOWLING-BALLS. Patent dated May 7, 1901. Disclaimer filed January 3, 1902, by the assignee, the *Bowling Ball Company*, New York, N. Y.

Enter its disclaimer—

To that claim in said patent which is in the following words, to wit:

"3. A bowling-ball provided with finger-sockets, the said finger-sockets having inner lining-tubes, and an interposed layer of yielding material between the wall of the socket and the lining-tube, the said lining-tube having an opening at its inner end adapted to be closed when the lining is in place to hold the lining under atmospheric pressure against displacement, substantially as set forth."—[*Official Gazette, January 14, 1902.*]